UNITED STATES PATENT OFFICE.

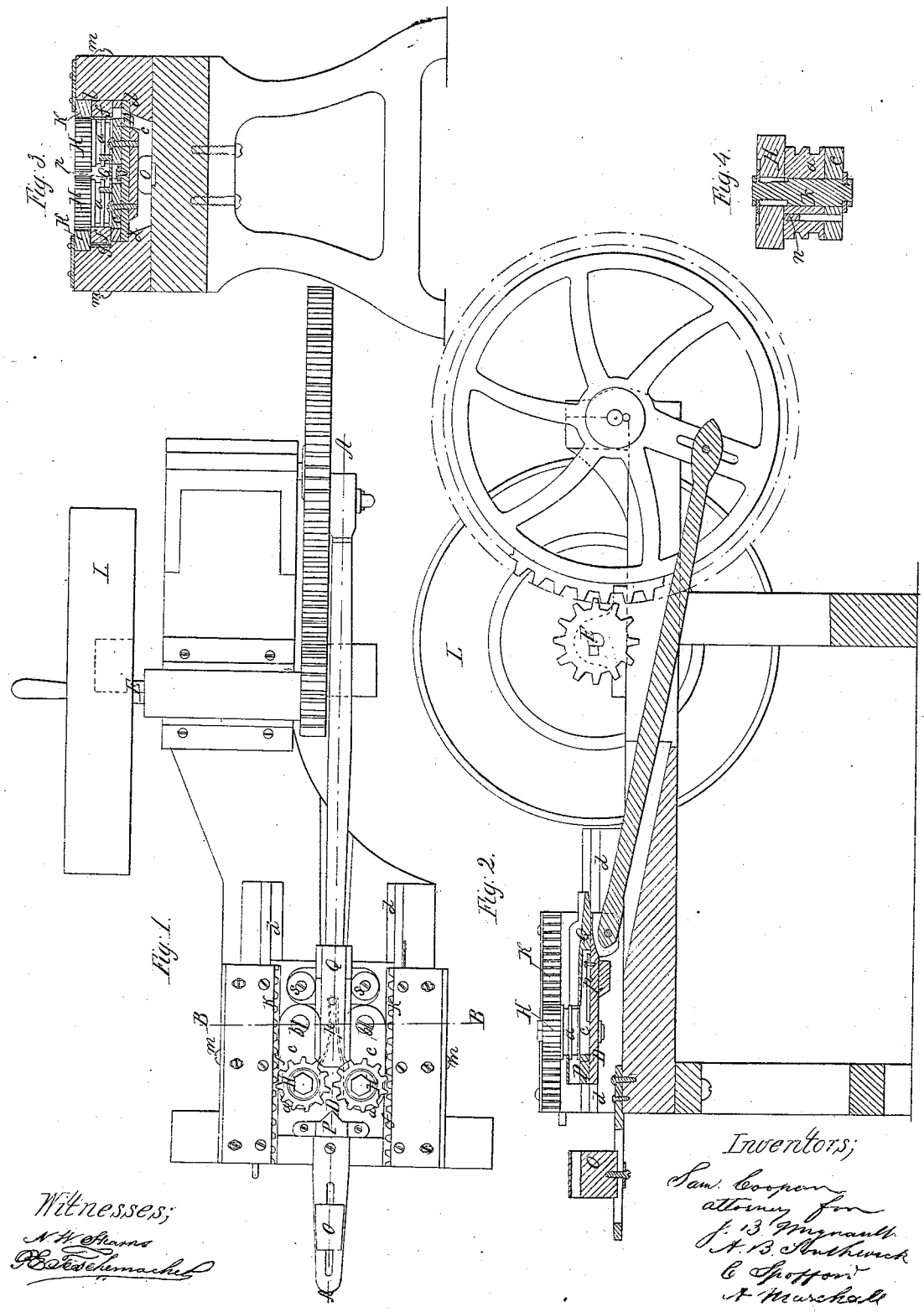

JOHN B. MIGNAULT, A. B. SOUTHWICK, AND CHARLES SPOFFORD, OF BALLARD VALE, AND ALBERT MARSHALL, OF LAWRENCE, MASSACHUSETTS, ASSIGNORS TO WM. P. PIERCE, PRESIDENT OF THE WHIPPLE FILE MANUFACTURING COMPANY, AND WM. P. PIERCE, ASSIGNOR TO SAID COMPANY.

IMPROVEMENT IN MACHINES FOR ROLLING METALS.

Specification forming part of Letters Patent No. 37,601, dated February 3, 1863.

*To all whom it may concern:*

Be it known that we, JOHN B. MIGNAULT, A. B. SOUTHWICK, and CHARLES SPOFFORD, all of Ballard Vale, in the county of Essex and State of Massachusetts, and ALBERT MARSHALL, of Lawrence, in the county and State aforesaid, have invented an Improved Machine for Rolling Metals, of which the following is a full, clear, and exact description, reference being had to the accompanying drawings, making part of this specification, in which—

Figure 1 is a plan of our machine; Fig. 2, a vertical section upon the line A A of Fig. 1; Fig. 3, a vertical section upon the line B B of Fig. 1; Fig. 4, a section through the rolls and their driving-gears.

Our invention has for its object to produce articles of irregular form—such as blanks for files and rasps—by rolling, the relative position of the rolls being governed while the articles are passing between them by pattern, as will now be more particularly described. The rolls *a* turn freely upon pins *k*, rising from links *c*, which links are pivoted at *b* to a traversing-carriage, D, that rests and slides upon ledges or ways *d* on the frame-work. The carriage is traversed longitudinally to and fro upon its ways by means of its connections with the driving shaft E, as seen in the drawings. The periphery of the rolls *a* may be plain or grooved to correspond to the contour of the article to be rolled, and upon the outside they bear against the patterns *f*, which are so shaped as to force the rolls toward each other or permit them to separate, and thus give the required form to the article. These patterns are adjusted by means of wedges *g*, placed behind one or both of them, in order to bring the rolls in the center of the machine, and they are also still further adjusted by means of a smaller wedge, *l*, behind the upper edge of one of them. Both the wedges *g* and *l* run the whole length of the pattern. Above the rolls *a*, and upon the same pins or bolts, are two spur-gears, H, which engage with racks K, secured to the frame-work in such position that, as the carriage D is traversed, the gears H are caused to revolve, and with them the rolls, the gears and the rolls being caused to revolve together by pins *n* upon the gears, which enter corresponding holes in the rolls. The rolls and gears are caused to recede from each other, and thus keep the latter always in contact with the racks by a spring, *p*, between them. The machine being set in motion by a belt upon the drum L, or in any suitable manner, pieces of metal of a size suitable for forming the blanks after being heated are entered through the guides O and P, the former upon the frame-work and the latter upon the traversing-carriage, and are seized by the rolls *a*, and, after passing through the machine they are conducted off by the guide-trough Q, secured to the carriage by the screws *s*. The patterns *f* are held in place by screws *m*, which pass through slots in the adjusting-wedges *g*, and are tightened up after the patterns are adjusted.

Although particularly adapted to rolling file-blanks, the machine above described may be employed for rolling other articles, suitable rolls and patterns being employed for the purpose.

What we claim as our invention, and desire to secure by Letters Patent, is—

The above-described machine for rolling metals, consisting essentially of the rolls *a* and gears H upon the traversing-carriage, in combination with the stationary patterns and rack-bars, operating in the manner substantially as set forth, for the purpose described.

JOHN B. MIGNAULT.
ALPHEUS B. SOUTHWICK.
CHARLES SPOFFORD.
ALBERT MARSHALL.

Witnesses:
SAM. COOPER,
P. E. TESCHEMACHER.